United States Patent [19]

Roberts et al.

[11] 4,198,774
[45] Apr. 22, 1980

[54] INDICIA FOR RUBBER ARTICLES

[75] Inventors: Charles W. Roberts, Akron, Ohio; Homer B. Lowther, Danville, Va.

[73] Assignee: The Goodyear Tire & Rubber Company, Akron, Ohio

[21] Appl. No.: 852,996

[22] Filed: Nov. 18, 1977

[51] Int. Cl.² ............................................. G09F 21/04
[52] U.S. Cl. ...................................... 40/587; 40/616; 152/353 R; 428/156; D12/152; D12/203
[58] Field of Search ............. 40/616, 587; 152/330 R, 152/353 R, 353 C, 330 A, DIG. 12; 264/132, 246; 428/156, 172, 914; D12/134, 152, 153, 203; 296/1 F

[56] References Cited

U.S. PATENT DOCUMENTS

| | | | |
|---|---|---|---|
| 1,458,629 | 6/1923 | Raymond | 152/DIG. 12 |
| 1,567,402 | 12/1925 | Venn | 152/353 |
| 1,635,077 | 5/1927 | Erskine | 40/618 |
| 2,082,928 | 6/1937 | Wilhelmy | D12/203 |
| 2,182,919 | 12/1939 | Hainsworth | 40/616 X |
| 3,518,335 | 6/1970 | Jablonski | 264/326 X |

FOREIGN PATENT DOCUMENTS

| | | | |
|---|---|---|---|
| 17143 | of 1896 | United Kingdom | 40/616 |
| 138775 | 2/1920 | United Kingdom | 40/616 |
| 330432 | 6/1930 | United Kingdom | 40/489 |

*Primary Examiner*—John F. Pitrelli
*Assistant Examiner*—G. Lee Skillington
*Attorney, Agent, or Firm*—D. M. Ronyak

[57] ABSTRACT

Indicia of enhanced visibility for rubber articles, and particularly for tires, are formed by a series of substantially straight lineal projections of the same approximate cross section integral of the article. The projections are continuous within the configuration of each indicium. Each indicium may include raised borders and/or may in total be raised above the surface of the article immediately surrounding the indicium. The cross-sectional width of a projection is from about 30 percent to 70 percent of the distance between the longitudinal axes of adjacent projections. To further enhance visibility dirt-retaining projections may be employed.

46 Claims, 17 Drawing Figures

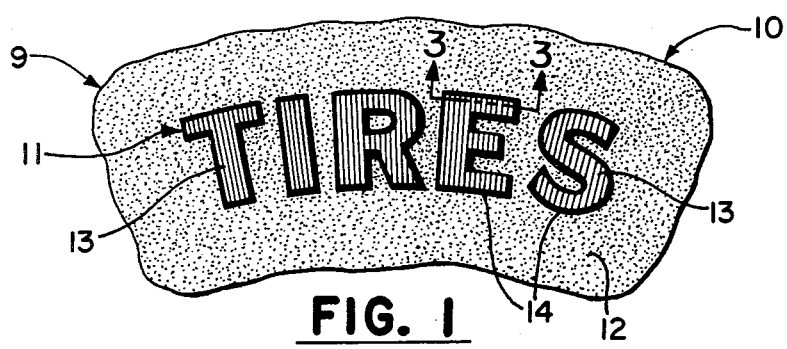
FIG. 1
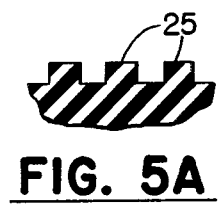
FIG. 5A
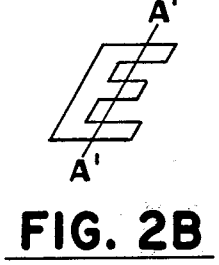
FIG. 2A
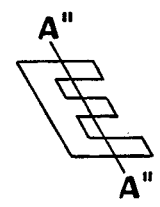
FIG. 2B
FIG. 2C
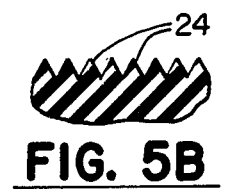
FIG. 5B
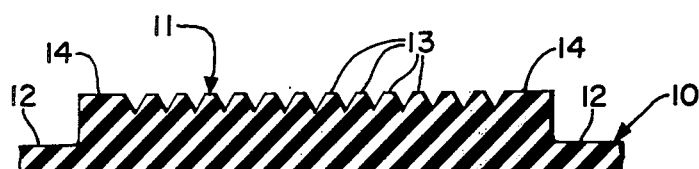
FIG. 3A
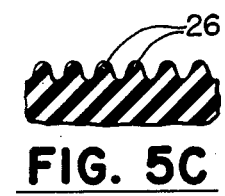
FIG. 5C
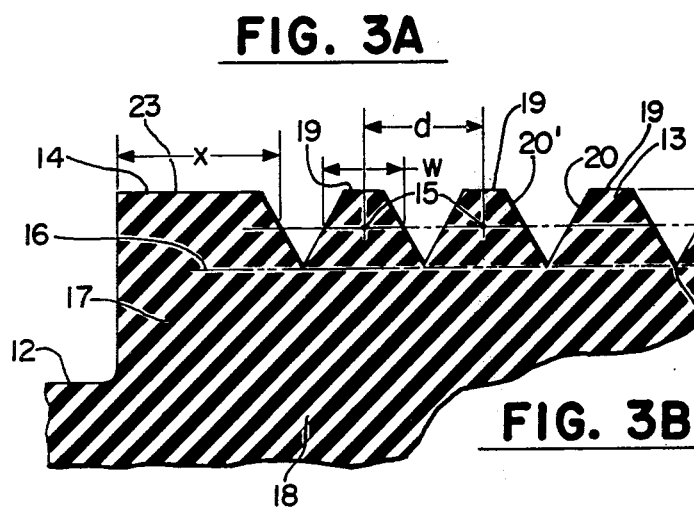
FIG. 3B
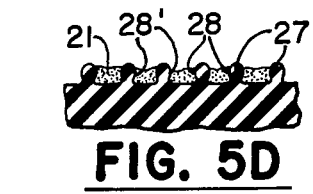
FIG. 5D
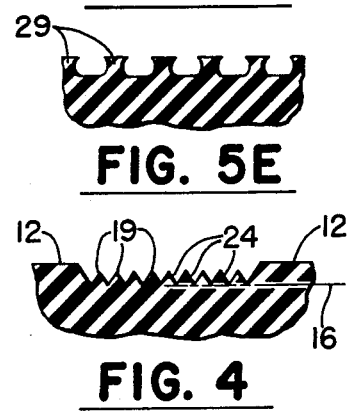
FIG. 5E
FIG. 4
FIG. 6A
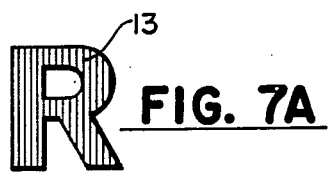
FIG. 7A
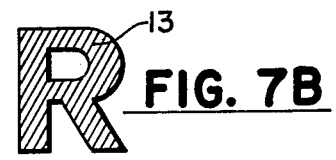
FIG. 7B
FIG. 6B
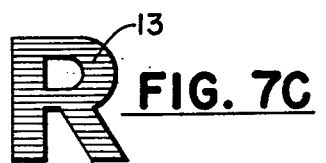
FIG. 7C
FIG. 7D

INDICIA FOR RUBBER ARTICLES

BACKGROUND OF THE INVENTION

This invention relates to indicia for molded rubber articles and particularly to indicia for tires.

PRIOR ART

Manufacturers have for many years placed indicia, that is, numerals, letters, characters, symbols, marks or other designations upon the sidewalls of their tires to enhance the appearance and marketability of their products. To heighten the visibility of these markings, manufacturers have used raised inidicia or indicia having raised outlines or have made the indicia of a compound that contrasts in color with the remainder of the sidewall of the tire or have painted the indicia with a color that contrasts with the remainder of the sidewall of the tire.

The use of color in these prior art systems requires additional expenditure on the part of manufacturers for materials and complicates the manufacturing process. A tire having colored indicia must be regularly cleaned by its owner in order to maintain its distinguishing appearance. Additionally, the owner must be careful not to scrape or abrade the sidewall region having colored indicia as additional colored material may be exposed, thus detracting from the appearance of the tire. When colored compounds are employed to integrally mold colored indicia with the tire, uniform symmetry of the tire sidewalls is seldom attained. The mechanical properties of the colored material, e.g. strength, fatigue, modulus, etc., are seldom equal to those of the black sidewall material and are usually inferior thereto. The colored indicia may become a point of initiation of tire failure, particularly due to cracking.

SUMMARY OF THE INVENTION

A primary object of this invention is to provide highly visible indicia for tire sidewalls without use of compounds or paints which contrast in color with the tire sidewalls.

Another object of this invention is to provide highly visible indicia integrally molded of the sidewalls of a tire.

It is a further object of this invention to provide a tire having sidewalls incorporating highly visible indicia utilizing less expensive materials and less manufacturing steps then previously necessary.

It is still another object of this invention to provide a tire having highly visible indicia upon its sidewalls that can be more easily maintained by its user.

According to the invention, an indicium is formed by a series of lineal projections molded upon the surface of the article, e.g. a tire, a hose, or a conveyor belt. The projections are substantially straight and parallel to one another and are continuous within the configuration of the indicium. All cross sections of any of the projections taken normal to the longitudinal axis of any of same are substantially identical. The indicium may also have a raised border about its configuration. This border is a lineal projection of substantially equal cross section throughout. The border may be of a cross-sectional width greater than that of any of the projections. It may protrude from the surface of the article an amount equal to or greater than the straight lineal projections bounded thereby.

The projections forming the indicium may originate from the surface of the article or from a solid raised portion integral of the surface of the article, the raised portion being in the configuration of the indicium. Alternatively, the projections may have their bases located below the surface of the article immediately surrounding the indicium. The height of the projections from their bases may be less than, equal to or greater than the distance from the surface of the article immediately surrounding the indicium to the bases of the projections.

The projections may be of any desirable cross section and may be broadly classified into two categories, those which achieve their maximum cross-sectional width at their junction with the article and those which achieve their maximum cross-sectional width outward of their junction with the article. Examples of projections in the first category are those having rectangular, sinusoidal, semicircular, triangular or trapezoidal cross sections. Such projections are easy to manufacture and to keep clean. Examples of projections in the second category are those of lenticular or teardrop cross section. Projections in this category further enhance visibility of the indicia through retention of dirt in their interstices which contrasts in definition with the article surface.

The cross-sectional width of any of the projections is from about 30 percent to 70 percent of the distance between the longitudinal axis of adjacent projections.

These and other objects and features of the invention will be apparent from the drawings and from the description of the preferred embodiment.

BRIEF DESCRIPTION OF THE DRAWINGS

FIG. 1 is a fragmentary plan view of an article such as the sidewall of an automobile tire illustrating the indicia according to the invention;

FIG. 2a is a plan view of the letter E having a vertical stroke;

FIG. 2b is a plan view of the letter E having a right slant stroke;

FIG. 2c is a plan view of the letter E having a left slant stroke;

FIG. 3a is a cross section along lines 3,3' of FIG. 1;

FIG. 3b is an enlargement of a portion of FIG. 3a illustrating the relationship of the projections to one another;

FIG. 4 is a vertical cross section of a fragment of an article including another embodiment of an indicium according to the invention;

FIGS. 5a, 5b, 5c, 5d, and 5e are vertical cross sections taken normal to the longitudinal axes of various projections according to the invention;

FIGS. 6a and 6b are plan views of indicia according to the invention illustrating the effect of varying the width of the individual projections while maintaining constant the distance between the longitudinal axes of the projections;

FIGS. 7a, 7b, and 7c are plan views of indicia according to the invention illustrating possible relationships between the longitudinal axes of the projections and the stroke of the indicium respectively parallel, oblique, and perpendicular; and FIG. 7d is a plan view of an indicium according to the invention also illustrating an oblique relationship between the longitudinal axes of the projections and the stroke of the indicium, where the longitudinal axes of the projections are horizontal.

DETAILED DESCRIPTION OF THE INVENTION

FIG. 1 is a fragmentary view of an article 9, such as the sidewall 10 of a pneumatic tire having upon it the indicia 11 of the invention. The indicia 11 is formed by a series of substantially straight parallel lineal projections 13 which are integral of the article 9. The projections 13 are continuous within the configuration of the indicia.

FIGS. 3a and 3b depict a preferred embodiment of the invention. The projections 13 are of substantially trapezoidal cross-sectional configuration. Each of the projections 13 has a base 16 integral of the article and sides 20,20' extending outward from the surface of the article. Each of the projections 13 is of substantially identical cross section, said cross sections being taken normal to the longitudinal axis 15 of each of the projections.

The longitudinal axis 15 of a given projection is a hypothetical line running the length of that projection midway of its vertical height h and equidistant of the lateral edges 20,20' of that projection. The vertical height h of a projection is the distance from its base 16 to its outermost tip or surface 19 as measured perpendicularly from its base. The cross-sectional width of a single projection is denoted as w in FIG. 3b and is defined as the distance between the lateral edges 20,20' of a given projection 13 midway of the vertical height h of said projection. The distance between adjacent projections is shown by the letter d in FIG. 3b and is defined as the distance between the longitudinal axes of adjacent projections in a plane taken normal to said longitudinal axes. The cross-sectional width of any of the projections 13 should be from about 30 percent to 70 percent of the distance between adjacent projections. Strongest visual impact is obtained when w is about 60 percent of d.

The projections may have their bases 16 at an elevation greater than that of the surface of the article immediately surrounding the indicia. The projections may arise from a solid raised portion 17 itself being in the configuration of the indicia. The interface of the solid raised portion with the surface of the body of the article is denoted by numeral 18. The incorporation of a solid raised portion 17 is preferred, but is not a necessity.

Completing the embodiment shown in FIG. 3 of the indicium of the invention is a lineal projection 14 about the periphery of boundary of the indicia. The border can be readily seen in the letter E of FIG. 1 and in FIG. 3A. The border 14 is of equal cross section throughout and of a width x that is greater than the width of any of the enclosed projections 13. The border 14 may be up to 5 times the width of any of the enclosed projections 13. Preferably, the width of the border 14 is about 3 times the width of any of the projections 13. The border is of height h at least equal to that of the projections 13 as measured from the base 22 of the border 14 to its outermost surface 23.

Indicia as used herein means numerals, letters, characters, symbols, marks, or designations employed for the purpose of decoration or communication. Indicia, whether according to this invention or not, can be of various strokes. The concept of stroke is illustrated in FIGS. 2a, 2b, and 2c. FIG. 2a is an indicium in the form of the letter E having a vertical stroke. The stroke is any line parallel to line A—A. FIG. 2b is an indicium in the form of the letter E having a right-slant stroke. The stroke is any line parallel to line A'—A'. FIG. 2c shows an indicia in the form of the letter E having a left-slant stroke. The stroke of the indicia is any line parallel to line A"—A".

Indicia according to this invention may be of any of the three categories of strokes previously defined. The projections 13 need not necessarily bear any specific relationship to the stroke of the indicia, but certain relationships are preferred.

The possible relationships of the axial direction of the projections to the stroke of the indicium are shown in FIGS. 7a, 7b, and 7c, which are plan views of the letter R. In FIG. 7a the longitudinal axes of the projections 13 are parallel to the stroke of the indicium. In FIG. 7b the longitudinal axes of the projections 13 are oblique to the stroke of the indicium. In FIG. 7c, the longitudinal axes of the projections 13 are perpendicular to the stroke of the indicium. FIG. 7d is a plan view of an indicium in the form of the letter S illustrating a special case of an oblique relationship between the projections 13 and the stroke of the indicium. The longitudinal axes of the projections 13 are horizontal while the stroke of the indicium is oblique. In indicium according to the invention, the longitudinal axes of the projections are preferably related to the stroke of indicium as shown in FIGS. 7a, 7c, or 7d.

Referring again to FIG. 3b, projections according to the preferred embodiment lie immediately adjacent to one another such that their lateral edges 20 and 20' intersect their bases 16 at or about a common point shown as numeral 21. Visibility of indicia formed according to this invention is not seriously impaired if there is a space between the points of intersection of lateral edges 20 and 20' with the base line 16 of adjacent projections provided the cross-sectional width of any of the projections 13 is not less than 30 percent or greater than 70 percent of the distance between the longitudinal axes 15 of adjacent projections.

The number of projections 13 per unit dimension is also important. Applicants have determined that use of less than four projections per centimeter does not result in significant visual enhancement when indicia of about two and one-half centimeters overall size are formed according to the invention.

The height of the projections 13 is not critical. Their height, as well as the height of the border 14, if used, and the thickness of the solid raised portion 17, if used, are matters of design and choice, according to the intended application and desired cosmetic effect, within constraints of practicality. For example, it may be desired to equip a four-wheel device recreational vehicle with tires having indicia according to the invention. Each indicium may have a solid raised portion twelve millimeters thick, projections two millimeters in height, and a border three millimeters in height to provide scuff projection to the projections. If the projections were of excessive height they would be difficult to mold and easily damaged upon use of the tire. If the height of the projections is too small, again, they may be easily abraded. A lower limit of two-tenths of a millimeter is recommended for the height of the projections.

The angle of either lateral edge, as defined in FIG. 3, or any tangent thereto in a case of non-planar lateral edges as shown in FIGS. 5c, 5d, and 5e, of any projection relative to its base should be between 45 degrees and 135 degrees.

Several different relationships are possible between the elevations of the base 16 of each of the projections 13, the outermost tip or surface 19 of each of the projections 13 and the surface 12 of the article immediately surrounding the indicium formed by the projections 13. The projections may have their bases at an elevation less than, equal to, or greater than that of the surface 12 of the article. The projections may have their outermost tip or surface 19 at an elevation less than, equal to, or greater than that of surface 12 of the article. All of the possible combinations are contemplated. A preferred embodiment is shown in FIGS. 3a and 3b.

FIG. 4 illustrates another embodiment of but one of the several different relationships available. Referring to FIG. 4, the base 16 of each of the projections 24 is at an elevation less than that of the surface 12 of the article immediately surrounding the indicium, and the maximum vertical height of each of the projections as defined in FIG. 3b is less than the distance between base 16 and surface 12. Alternatively, stated, the outermost tip or surface 19 of each of the projections 24 is at an elevation less than that of surface 12 of the article immediately surrounding the indicium. Because the outermost tip or surface 19 is somewhat recessed relative to surface 12, the projections are protected by surface 12 from abrasion.

FIGS. 5a, 5b, 5c, 5d and 5e are examples of other possible cross-sectional configurations for the projections, and are not intended to be limiting. The invention contemplates all cross-sectional configurations. In FIG. 5a each projection 25 is of substantially rectangular cross section. In FIG. 5b the projections 24 are of triangular cross section. In FIG. 5c the projections 26 are of sinusoidal cross sections. In FIG. 5d the projections 27 are of teardrop cross section. Not shown but related are projections of lenticular cross section. In FIG. 5e the projections 29 resemble the lower half of the projections in FIG. 5d.

The cross-sectional configuration of the projections depicted in FIGS. 5d and 5e are such that the maximum cross-sectional width occurs at a vertical distance above their bases. Indicia formed of these or any other projections of which the maximal cross-sectional width occurs at a point above their bases can additionally provide visual enhancement through retention of earth in their interstices. This is illustrated in FIG. 5d whereby earth 21 is retained by the undercut lateral edges 28,28' of adjacent projections. Indicia formed of such projections are particularly adaptable to the sidewalls of tires intended for off-highway vehicles such as motorcycles, all terrain vehicles, and vehicles having multiple driven axles.

When vehicles of these types are operated off of the highway, they often encounter water, dirt, and combinations thereof which are soft enough to permit the sidewalls of the tires of any of such vehicles to become embedded therein. Upon withdrawal of the sidewalls of the tire from such soft wet spots, wet earth is retained in the spaces between the projections. Due to the undercut shape of the projections, this dirt can only be removed by vigorous washing. The color of the dirt, whether damp or not, is nearly always different from that of the rubber compound of which the sidewalls of the tire are formed, thus providing further visual enhancement of the indicia on the sidewalls of the tire. Projections of the type just described and their operation in retaining dirt are particularly useful for obtaining the macho-effect that is popular today.

METHOD OF FORMATION

Indicia according to this invention may be formed by cutting, abrading, molding, or combinations thereof. The indicia may be formed independently of the article and later chemically bonded or vulcanized to the article. Preferably, they are formed integrally of the article. Indicia according to the preferred embodiment as shown in FIG. 3b are formed by molding and vulcanizing integral of the article. Surfaces 19 of the projections and 23 of the borders are buffed or ground after vulcanization. Where possible, molding alone is desirable due to its economy. Where only a limited number of articles having indicia according to this invention are to be manufactured, cutting and/or grinding operations may be preferable to the provision of molds for the indicia. Indicia according to FIG. 4 can be readily formed in this manner.

While certain representative embodiments and details have been shown for the purpose of illustrating the invention, it will be apparent to those skilled in the art that various changes and modifications may be made therein without departing from the spirit or scope of the invention.

What is claimed is:

1. A colored rubber article including an indicium comprising:
    at least eight lineal projections having their bases integral of said article, said projections being substantially straight and parallel to one another, and being continuous within the configuration of said indicium, said projections having substantially identical cross sections, said cross sections being taken normal to the longitudinal axes of said projections, the material of said rubber article and said indicium being of generally the same color.

2. The indicium of claim 1, wherein the cross-sectional width of any of said projections is from about 30 percent to 70 percent of the distance between the longitudinal axes of adjacent projections, as determined in a plane substantially perpendicular to the longitudinal axes of said projections, said width of any of said projections being determined in said plane substantially midway of the vertical height of any of said projections.

3. The indicium of claim 1, wherein the cross-sectional width of any of said projections is about 60 percent of the distance between the longitudinal axes of adjacent projections, as determined in a plane substantially perpendicular to the longitudinal axes of said projections, said width of any of said projections being determined in said plane substantially midway of the vertical height of any of said projections.

4. The indicium of claim 1, further having a border comprising a lineal projection about the periphery of said indicium, said border being of equal cross section throughout.

5. The indicium of claim 4, wherein said border protrudes from the surface of the article surrounding said indicium an amount at least equal to said straight lineal projections which are bounded thereby.

6. The indicium of claim 4, wherein the cross-sectional width of said border at one-half of its height is greater than the cross-sectional width of any of said projections at one-half of its height; said cross section being taken normal to the longitudinal axis respectively of said border or any of said projections.

7. The indicia of claim 6, wherein said border is of a width up to about five times the width of a single projection.

8. The indicium of claim 7, wherein said border is of a width about three times the width of a single projection.

9. The indicium of claim 1, wherein the longitudinal axes of said projections are substantially perpendicular to the stroke of the indicium.

10. The indicium of claim 1, wherein the longitudinal axes of said projections are substantially parallel to the stroke of the indicium.

11. The indicium of claim 1, wherein the longitudinal axes of said projections are substantially oblique to the stroke of the indicium, said axes being substantially horizontal in plan view of said indicium.

12. The indicium of claim 1, wherein said projections are of maximum cross-sectional width at a point above their bases.

13. The indicium of claim 12, wherein said projections are of substantially teardrop cross section.

14. The indicia of claim 1, wherein the projections are of substantially trapezoidal cross section.

15. The indicium of claim 1, wherein the projections are of substantially rectangular cross section.

16. The indicium of claim 1, wherein each of said projections has lateral edges, each of said edges of any given projection forming an angle from about 45 degrees to about 135 degrees with respect to the base of that projections.

17. An indicium for a rubber article comprising: at least eight lineal projections having their bases in a solid raised portion integral of said article, said portion being in the configuration of said indicium, said projections being substantially straight and parallel to one another, and being continuous within the configuration of said indicium, said projections having substantially identical cross sections, said cross sections being taken normal to the longitudinal axes of said projections.

18. A colored rubber article including an indicium comprising:
at least eight lineal projections having their bases integral of said article, said projections being substantially straight and parallel to one another, and being continuous within the configuration of said indicium, said projections having substantially identical cross sections, said cross sections being taken normal to the longitudinal axes of said projections, wherein said bases of said projections are located at an elevation less than that of the surface of the article immediately surrounding said indicium, and the area immediately surrounding said indicium is higher than at least a portion of said projections, the material of said rubber article and said projections being of generally the same color.

19. The indicium of claim 18, wherein the maximum height of said projections from their bases is less than to about equal to the distance from the surface of the article surrounding said indicium to said bases of said projections.

20. The indicium of claim 18, wherein the minimum height of said projections from their bases is at least equal to the distance from the surface of the article surrounding said indicium to said bases of said projections.

21. A colored rubber article including an indicium comprising:
a plurality of lineal projections having their bases integral of said article, there being at least four projections per centimeter, said projections being substantially straight and parallel to one another and being continuous within the configuration of said indicium, said projections having substantially identical cross sections being taken normal to the longitudinal axes of said projections, the material of said rubber article and said indicium being of generally the same color.

22. An indicium for a rubber article comprising:
(a) a solid portion in the configuration of said indicium raised from the surface of said article surrounding said indicium;
(b) at least eight lineal projections having their bases integral of said portion, said projections being substantially straight and parallel to one another and being continuous within the configuration of said indicium, said projections having substantially identical cross sections, said cross sections being taken normal to the longitudinal axes of said projections, wherein the cross-sectional width of any of said projections is from about 30 percent to 70 percent of the distance between the longitudinal axes of adjacent projections, as determined in a plane substantially perpendicular to the longitudinal axes of said projections, said width of any of said projections being determined in said plane substantially midway of the vertical height of any of said projections; and
(c) a raised border comprising a lineal projection about the periphery of said indicium, said border being of equal cross section throughout, said border protruding from the surface of said portion an amount at least equal to that of said projections bounded thereby, said border being of greater cross-sectional width at one-half of its vertical height than the cross-sectional width of any of said projections bounded thereby at one-half of its vertical height, said cross section of said border being taken substantially normal to its longitudinal axis.

23. An indicium for a rubber article comprising:
(a) a solid portion in the configuration of said indicium raised from the surface of said article surrounding said indicium;
(b) a plurality of lineal projections having their bases integral of said portion, there being at least four projections per centimeter, said projections being substantially straight and parallel to one another and being continuous within the configuration of said indicium, said projections having substantially identical cross sections, said cross sections being taken normal to the longitudinal axes of said projections, wherein the cross-sectional width of any of said projections is from about 30 percent to 70 percent of the distance between the longitudinal axes of adjacent projections as determined in a plane substantially perpendicular to the longitudinal axes of said projections, said width of any of said projections being determined in said plane substantially midway of the vertical height of any of said projections; and
(c) raised border comprising a lineal projection about the periphery of said indicium, said border being of equal cross section throughout, said border protruding from the surface of said portion an amount at least equal to that of said projections bounded thereby, said border being of greater cross-sectional width at one-half of its vertical height than the cross-sectional width of any of said projections bounded thereby at one-half of its vertical height, said cross section of said border being taken substantially normal to its longitudinal axis.

24. A tire having an indicium comprising at least eight lineal projections having their bases integral of said tire, said projections being substantially straight and parallel to one another, and being continuous within the configuration of said indicium, said projections having substantially identical cross sections, said cross sections being taken normal to the longitudinal axes of said projections, said material of said tire and said indicium being of generally the same color.

25. A tire having an indicium according to claim 24, wherein the cross-sectional width of any of said projections is from about 30 percent to 70 percent of the distance between the longitudinal axes of adjacent projections, as determined in a plane substantially perpendicular to the longitudinal axes of said projections, said width of any of said projections being determined in said plane substantially midway of the vertical height of any of said projections.

26. A tire having an indicium according to claim 24, wherein the cross-sectional width of any of said projections is about 60 percent of the distance between the longitudinal axes of adjacent projections, as determined in a plane substantially perpendicular to the longitudinal axes of said projections, said width of any of said projections being determined in said plane substantially midway of the vertical height of any of said projections.

27. A tire having an indicium according to claim 24, further having a border comprising a lineal projection about the periphery of said indicium, said border being of equal cross section throughout.

28. A tire having an indicium according to claim 27, wherein said border protrudes from the surface of the article surrounding said indicium an amount at least equal to said straight lineal projections which are bounded thereby.

29. A tire having an indicium according to claim 27, wherein the cross-sectional width of said border at one-half of its height is greater than the cross-sectional width of any of said projections at one-half of its height; said cross section being taken normal to the longitudinal axis respectively of said border or any of said projections.

30. A tire having an indicium according to claim 29, wherein said border is of a width up to about five times the width of a single projection.

31. A tire having an indicium according to claim 29, wherein said border is of a width about three times the width of a single projection.

32. A tire having an indicium according to claim 24, wherein the longitudinal axes of said projections are substantially perpendicular to the stroke of the indicium.

33. A tire having an indicium according to claim 24, wherein the longitudinal axes of said projections are substantially parallel to the stroke of the indicium.

34. A tire having an indicium according to claim 24, wherein the longitudinal axes of said projections are substantially oblique to the stroke of the indicium, said axes being substantially horizontal in plan view of said indicium.

35. A tire having an indicium according to claim 24, wherein said projections are of maximum cross-sectional width at a point above their bases.

36. A tire having an indicium according to claim 35, wherein said projections are of substantially teardrop cross section.

37. A tire having an indicium according to claim 24, wherein the projections are of substantially trapezoidal cross section.

38. A tire having an indicium according to claim 24, wherein the projections are of substantially rectangular cross section.

39. A tire having an indicium according to claim 24 wherein each of said projections has lateral edges, each of said edges of any given projection forming an angle from about 45 degrees to about 135 degrees with respect to the base of that projection.

40. A tire having an indicium comprising at least eight lineal projections having their bases in a solid raised portion integral of said tire, said portion being in the configuration of said indicium, said projections being substantially straight and parallel to one another, and being continuous within the configuration of said indicium, said projections having substantially identical cross sections, said cross sections being taken normal to the longitudinal axes of said projections.

41. A tire having on its outer peripheral surface an indicium comprising at least eight lineal projections having their bases integral of said tire, said projections being substantially straight and parallel to one another, and being continuous within the configuration of said indicium, said projections having substantially identical cross sections, said cross sections being taken normal to the longitudinal axes of said projections, wherein said bases of said projections are located at an elevation less than that of the surface of the article immediately surrounding said indicium, and the area immediately surrounding said indicium is higher than at least a portion of said projections, the outermost tips of said projections being at an elevation at least equal to the surface of the article immediately surrounding said indicium.

42. A tire having an indicium according to claim 41, wherein the maximum height of said projections from their bases is less than to about equal to the distance from the surface of the article surrounding said indicium to said bases of said projections.

43. A tire having an indicium according to claim 41, wherein the minimum height of said projections from their bases is at least equal to the distance from the surface of the article surrounding said indicium to said bases of said projections.

44. A tire having an indicium comprising a plurality of lineal projections having their bases integral of said article, there being at least four projections per centimeter, said projections being substantially straight and parallel to one another and being continuous within the configuration of said indicium, said projections having substantially identical cross sections being taken normal to the longitudinal axes of said projections, said material of said tire and said indicium being of generally the same color.

45. A tire having an indicium comprising:
(a) a solid portion in the configuration of said indicium raised from the surface of said tire surrounding said indicium;
(b) at least eight lineal projections having their bases integral of said portion, said projections being substantially straight and parallel to one another and being continuous within the configuration of said indicium, said projections having substantially identical cross sections; said cross-sections being taken normal to the longitudinal axes of said projections, wherein the cross-sectional width of any of said projections is from about 30 percent to 70 percent of the distance between the longitudinal axes of adjacent projections, as determined in a plane substantially perpendicular to the longitudinal axes of said projections, said width of any of said projections being determined in said plane substantially midway of the vertical height of any of said projections; and (c) a raised border comprising a lineal projection about the periphery of said indicium, said border being of equal cross section throughout, said border protruding from the surface of said portion an amount at least equal to that of said projections bounded thereby, said border being of greater cross-sectional width at one-half of its vertical height than the cross-sectional width of any of said projections bounded thereby at one-half of its vertical height, said cross section of said border being taken substantially normal to its longitudinal axis.

46. A tire having an indicium comprising:
(a) a solid portion in the configuration of said indicium raised from the surface of said article surrounding said indicium;
(b) a plurality of lineal projections having their bases integral of said portion, there being at least four projections per centimeter, said projections being substantially straight and parallel to one another and being continuous within the configuration of said indicium, said projections having substantially identical cross section, said cross sections being taken normal to the longitudinal axes of said projections, wherein the cross-sectional width of any of said projections is from about 30 percent to 70 percent of the distance between the longitudinal axes of adjacent projections as determined in a plane substantially perpendicular to the longitudinal axes of said projections, said width of any of said projections being determined in said plane substantially midway of the vertical height of any of said projections; and (c) a raised border comprising a lineal projection about the periphery of said indicium, said border being of equal cross section throughout, said border protruding from the surface of said portion an amount at least equal to that of said projections bounded thereby, said border being of greater cross-sectional width at one-half of its vertical height than the cross-sectional width of any of said projections bounded thereby at one-half of its vertical height, said cross section of said border being taken substantially normal to its longitudinal axis.

* * * * *